US011331732B2

(12) United States Patent
Kani et al.

(10) Patent No.: US 11,331,732 B2
(45) Date of Patent: May 17, 2022

(54) POWER TOOL

(71) Applicant: MAKITA CORPORATION, Anjo (JP)

(72) Inventors: Toshiyuki Kani, Anjo (JP); Hiromu Goto, Anjo (JP); Kenji Hamada, Anjo (JP); Masaki Murakami, Anjo (JP)

(73) Assignee: MAKITA CORPORATION, Anjo (JP)

( * ) Notice: Subject to any disclaimer, the term of this patent is extended or adjusted under 35 U.S.C. 154(b) by 271 days.

(21) Appl. No.: 16/852,613

(22) Filed: Apr. 20, 2020

(65) Prior Publication Data

US 2020/0368831 A1 Nov. 26, 2020

(30) Foreign Application Priority Data

May 22, 2019 (JP) .............................. JP2019-096021

(51) Int. Cl.
| | |
|---|---|
| *B23D 45/16* | (2006.01) |
| *B23D 51/16* | (2006.01) |
| *B27B 5/38* | (2006.01) |
| *B27B 5/32* | (2006.01) |
| *H02K 7/00* | (2006.01) |
| *H02K 7/14* | (2006.01) |
| *B27B 5/36* | (2006.01) |

(52) U.S. Cl.
CPC ........... *B23D 45/16* (2013.01); *B23D 51/166* (2013.01); *B27B 5/32* (2013.01); *B27B 5/38* (2013.01); *H02K 7/003* (2013.01); *H02K 7/145* (2013.01); *B27B 5/36* (2013.01)

(58) Field of Classification Search
CPC ........ B23D 45/16; B23D 45/00; B23D 49/16; B23D 51/166; B23D 51/16; B27B 5/32; B27B 5/36; B27B 5/38; B27B 5/29; H02K 7/003; H02K 7/145; Y10T 83/9459; Y10S 83/01
USPC ..................... 30/374, 388; 408/710; 409/710
See application file for complete search history.

(56) References Cited

U.S. PATENT DOCUMENTS

| | | | |
|---|---|---|---|
| 5,191,968 A * | 3/1993 | McCurry ........... | B23Q 11/0092 200/43.11 |
| 9,855,649 B2 * | 1/2018 | Schnell ................. | B23Q 5/043 |

(Continued)

FOREIGN PATENT DOCUMENTS

| | | |
|---|---|---|
| JP | H07-031302 U | 6/1995 |
| JP | H08-267376 A | 10/1996 |

(Continued)

*Primary Examiner* — Phong H Nguyen
(74) *Attorney, Agent, or Firm* — Oliff PLC

(57) ABSTRACT

Twisting of a locking member due to cogging torque is reduced without lowering the locking and unlocking operability for a user. A power tool includes a housing, an electric motor located inside the housing and including a permanent magnet, a shaft rotatable about an axis relative to the housing to transmit power from the electric motor, a locking member movable between a lock position and an unlock position in a nonenergized state of the electric motor and engageable with the shaft at the lock position to lock rotation of the shaft, and an abutting member that applies, to the locking member at the lock position, a force in a direction opposite to an axial torque caused by the permanent magnet and applied to the locking member.

16 Claims, 15 Drawing Sheets

(56) References Cited

U.S. PATENT DOCUMENTS

| | | | | |
|---|---|---|---|---|
| 2001/0052419 A1* | 12/2001 | Quirijnen | ............... | B25F 5/001 |
| | | | | 173/171 |
| 2002/0026717 A1* | 3/2002 | Hartmann | ................. | B27B 5/38 |
| | | | | 30/388 |
| 2005/0155227 A1* | 7/2005 | Botefuhr | ............... | B24B 23/022 |
| | | | | 30/276 |

FOREIGN PATENT DOCUMENTS

| | | |
|---|---|---|
| JP | 2001-293672 A | 10/2001 |
| JP | 2003-251523 A | 9/2003 |

* cited by examiner (a) ROTATION ANGLE 0°

(b) ROTATION ANGLE 7.5°

(d) ROTATION ANGLE 22.5°

(e) ROTATION ANGLE 30°

POWER TOOL

CROSS-REFERENCE TO RELATED APPLICATIONS

This application claims the benefit of priority to Japanese Patent Application No. 2019-096021, filed on May 22, 2019, the entire contents of which are hereby incorporated by reference.

BACKGROUND

1. Technical Field

The present invention relates to a power tool.

2. Description of the Background

A power tool that rotates a tip tool such as a saw blade for machining includes a shaft locking mechanism used to lock the rotation of a spindle when the tip tool is attached to or detached from the spindle. The shaft locking mechanism typically includes a locking member to be engaged with a power transmission shaft such as a motor shaft or the spindle. The user presses the locking member inward or otherwise forces it to be engaged with the shaft to lock the rotation. Some power tools incorporate an electric motor that includes permanent magnets. When the motor is nonenergized, the permanent magnets and teeth with wires wound around them attract each other to generate torque referred to as cogging torque, which is applied to the rotor. The cogging torque is also transmitted from the rotor to the power transmission shaft such as the motor shaft or the spindle. Under the cogging torque, engaging the locking member with the shaft may twist the locking member, causing the locking and unlocking operations to be unsmooth. As an example technique for improving the operation of the locking member, Japanese Unexamined Patent Application Publication No. 2003-251523 describes a power tool having a locking member with opposite nonparallel flat surfaces formed on its engaging portion to relieve shaft biting.

BRIEF SUMMARY

Among other motors, brushless motors tend to include permanent magnets with a high magnetic force. Such brushless motors may generate high cogging torque and further deteriorate the operation of the locking member. A spring may be used to urge the locking member in the unlocking direction. The user may simply reduce the pressing force to allow the locking member to automatically return to its unlock position. A stiffer spring can forcibly return the locking member to the unlock position against the friction due to cogging torque. However, the user may have difficulty in pressing the locking member and have lower operability.

One or more aspects of the present invention are directed to a power tool that reduces twisting of a locking member due to cogging torque without lowering the locking and unlocking operability for a user.

An aspect of the present invention provides a power tool, including:
 a housing;
 an electric motor located inside the housing and including a permanent magnet;
 a shaft rotatable about an axis relative to the housing and configured to transmit power from the electric motor;
 a locking member movable between a lock position and an unlock position in a nonenergized state of the electric motor, and engageable with the shaft at the lock position to lock rotation of the shaft; and
 an abutting member configured to apply, to the locking member at the lock position, a force in a direction opposite to an axial torque caused by the permanent magnet and applied to the locking member.

DETAILED DESCRIPTION

Figure 1:
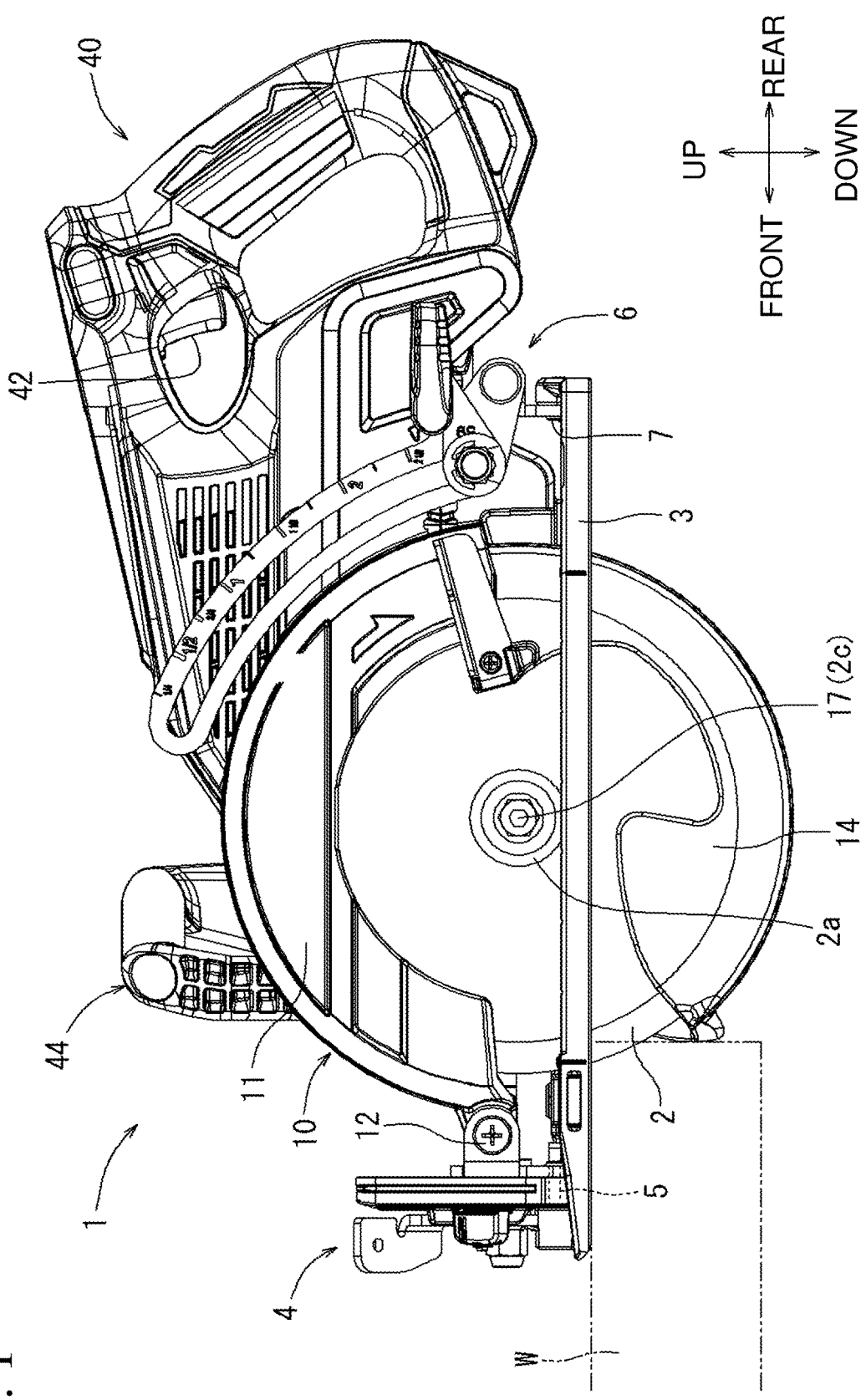
FIG. 1 is a left side view of a power tool according to a first embodiment.

Embodiments of the present invention will now be described with reference to the drawings. In the embodiments, the same or corresponding components are given the same reference numerals and will not be described repeatedly.

First Embodiment

Power Tool

Figure 2:
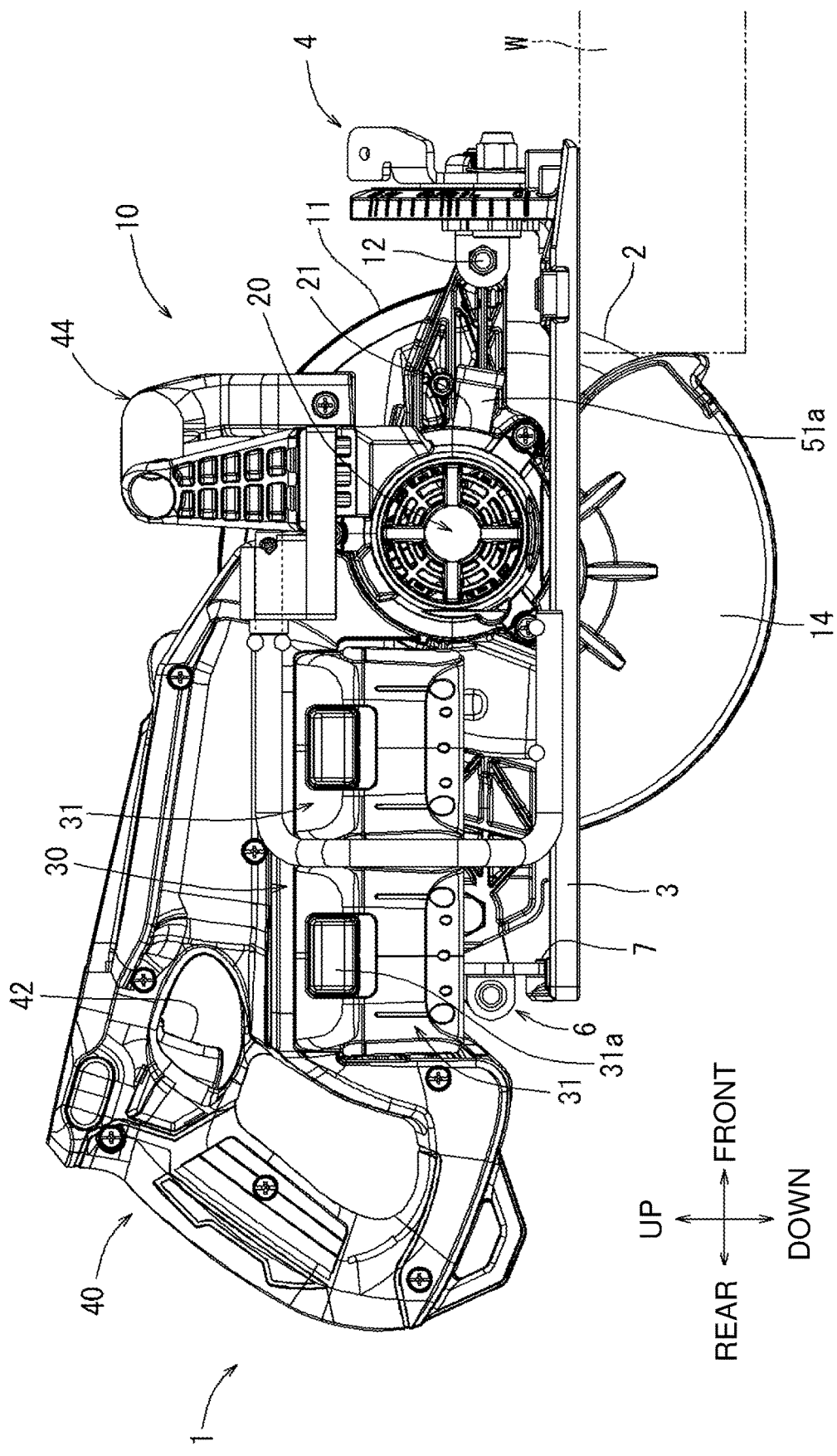
FIG. 2 is a right side view of the power tool according to the first embodiment.
Figure 3:
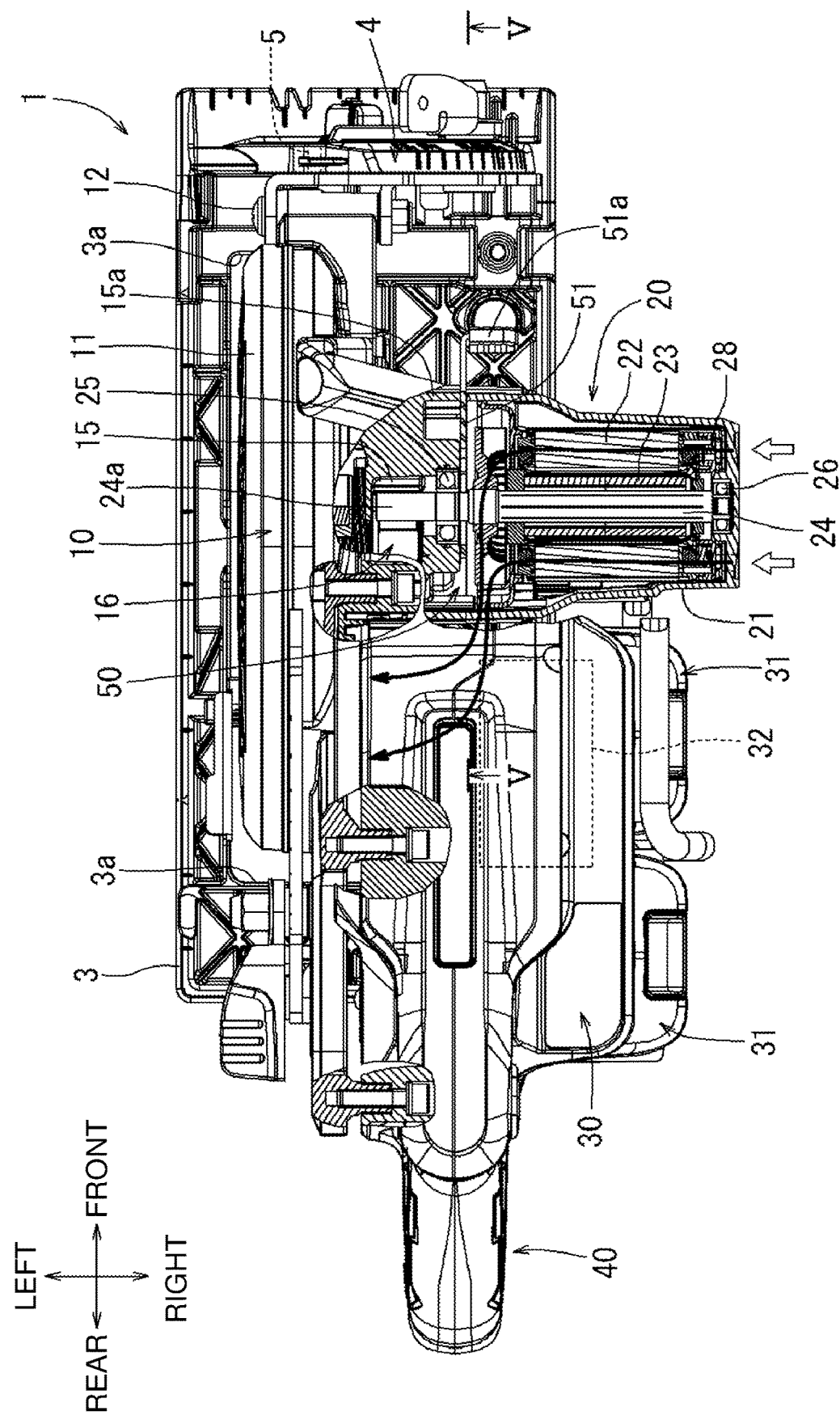
FIG. 3 is a plan view of the power tool according to the first embodiment, showing its electric motor and handle partially cut away.

FIGS. 1 to 3 show a portable circular saw 1 as a power tool according to a first embodiment. A portable circular saw is a portable cutting machine that is a cutting power tool portable by an operator. Other examples of portable cutting machines include a cutter. The portable circular saw 1 includes a tool body 10 and a base 3. The base 3 supports the tool body 10. A circular saw blade 2 (tip tool) is attachable to and detachable from the tool body 10. The saw blade 2 is rotated by an electric motor 20 serving as a driving source incorporated in the tool body 10. The base 3 has a window 3a opening through it in the vertical direction. The saw blade 2 has a lower portion protruding downward from the base 3 through the window 3a. To cut a workpiece W, the user places the base 3 on the upper surface of the workpiece W and cuts into the workpiece W with the saw blade 2 protruding downward from the base 3.

Although a portable circular saw as an example of a power tool according to one embodiment will now be described, a power tool according to another embodiment may be a tabletop circular saw or a sliding circular saw having a circular saw blade as its tip tool similarly to a portable circular saw. The portable circular saw 1 has the circular saw blade 2 as its tip tool. However, a drill or a router according to another embodiment having a rotational tip tool other than the saw blade 2 may have the same structure and features as described below.

The tool body 10 has, at its rear, a loop-shaped main handle 40 gripped by a user. The main handle 40 protrudes rearward further from the rear edge of the base 3. The main handle 40 has a trigger-shaped switch lever 42 in its upper portion. When the user grips the main handle 40 and pulls the switch lever 42 with a finger, the electric motor 20 is activated to rotate the saw blade 2. A front handle 44 is located above the electric motor 20. When cutting, the user stands behind the portable circular saw 1, holds the front handle 44 with one hand and the main handle 40 with the other hand, and moves the portable circular saw 1 forward. Hereafter, the orientation of the portable circular saw 1 is specified by defining the cutting direction as a frontward direction, and the direction toward the standing user as a rearward direction.

The tool body 10 includes a stationary cover 11 and a movable cover 14. The stationary cover 11 is formed from metal and covers substantially the upper half of the saw blade 2. The movable cover 14 may substantially cover the lower half of the saw blade 2. The movable cover 14 is supported in a rotatable manner substantially about the center of the saw blade 2, and rotates to open and close.

The base 3 has a support 4 on its upper front. The tool body 10 is supported at the front of the stationary cover 11 with a swing support shaft 12 in a vertically swingable manner with respect to the support 4. Vertically swinging the tool body 10 about the swing support shaft 12 changes the degree by which the saw blade 2 protrudes downward from the base 3 to adjust the depth of a cut in the workpiece W with the saw blade 2. The base 3 has a support 6 on its upper rear. The tool body 10 is supported in a laterally tiltable manner with respect to the base 3 with a tilt support shaft 5 included in the support 4 and a tilt support shaft 7 included in the support 6. The tool body 10 is laterally tilted about the tilt support shafts 5 and 7 to adjust the angle of a cut in the workpiece W with the saw blade 2.

Electric Motor

As shown in FIG. 3, the stationary cover 11 receives the electric motor 20 installed on its back surface with a reduction gear train 15. The electric motor 20 is mounted transversely with its rotational axis orthogonal to the plane of the saw blade 2. The reduction gear train 15 is accommodated in a gear housing 15a integral with the back surface of the stationary cover 11. The stationary cover 11 and the gear housing 15a are integrally formed from metal (e.g., by magnesium die-casting). The gear housing 15a is coupled with a motor housing 21 formed from metal (e.g., by aluminum die-casting).

The electric motor 20 is, for example, an inner-rotor brushless motor. The electric motor 20 includes a cylindrical stator 22 and a rotor 23. The rotor 23 is supported inside the stator 22 in a rotatable manner. A brushless motor eliminates commutators and brushes on a rotor 23, and thus its electric motor 20 has a smaller axial (lateral) dimension. The stator 22 is an armature and includes multiple teeth 22a (FIG. 10) around which wires (not shown) are wound. The teeth 22a are arranged at circumferentially equal intervals and protrude inward. The rotor 23 includes multiple permanent magnets 23a (FIG. 10) embedded in its core at circumferentially equal intervals to alternate in polarity. The electric motor 20 includes a motor shaft 24 that outputs rotational power in cooperation with the rotor 23. The motor shaft 24 extends through a partition 15b (FIG. 4) included in the gear housing 15a. Both ends of the motor shaft 24 are supported on bearings 25 and 26 in a rotatable manner. The left bearing 25 is fixed to the gear housing 15a. The right bearing 26 is fixed to the rear surface of the motor housing 21.

As shown in FIGS. 1 and 3, the saw blade 2 is attached to a spindle 17, which is parallel to the motor shaft 24. The spindle 17 is supported on the gear housing 15a in a rotatable manner. The reduction gear train 15 is located between the electric motor 20 and the spindle 17. The reduction gear train 15 reduces the rotation of the electric motor 20. The motor shaft 24 receives a drive gear 24a integral with its left distal end. The drive gear 24a meshes with a follower gear 16 integral with the spindle 17. The distal end of the spindle 17 protrudes into the stationary cover 11. The saw blade 2 is attached to the protrusion of the spindle 17. The saw blade 2 is held between an outer flange 2a and an inner flange (not shown). When locked in the held state with a fixing bolt 2c fastened into the distal end surface of the spindle 17, the saw blade 2 is secured to the spindle 17 in a nonrotatable manner.

Battery Mount

As shown in FIGS. 2 and 3, a battery mount 30 is located behind the electric motor 20. The battery mount 30 receives a battery pack 31. The battery pack 31 serves as a power supply for the portable circular saw 1. For example, the battery mount 30 receives two battery packs 31 aligned in the front-rear direction on its lower surface. The battery packs 31 are, for example, 18-volt lithium-ion batteries attachable to various power tools. Each battery pack 31 may be detached from the battery mount 30 and charged using a separate charger. The battery pack 31 may be used repeatedly in this manner as a power supply. In place of the battery mount 30, a power tool may use a 100-volt alternating-current (AC) utility power.

Controller

As shown in FIG. 3, the battery mount 30 accommodates a controller 32 in its internal space. The controller 32 includes various circuits that control the operation of the electric motor 20 and power supply. The stator 22 includes a sensor board 28 attached to it. The sensor board 28 includes a magnetic sensor that detects the rotational position of the rotor 23. The controller 32 incorporates circuits such as a control circuit, a switching circuit, and an automatic stop circuit. The control circuit, which is a microcomputer, transmits a control signal based on the positional information about the rotor 23 obtained by the sensor board 28. The switching circuit, which is a field-effect transistor (FET), switches currents to the electric motor 20 in response to the control signal received from the control circuit. The automatic stop circuit cuts power supply to the electric motor 20 to prevent overdischarge or overcharge in accordance with the detected status of the battery pack 31.

Shaft Locking Mechanism

Figure 4:
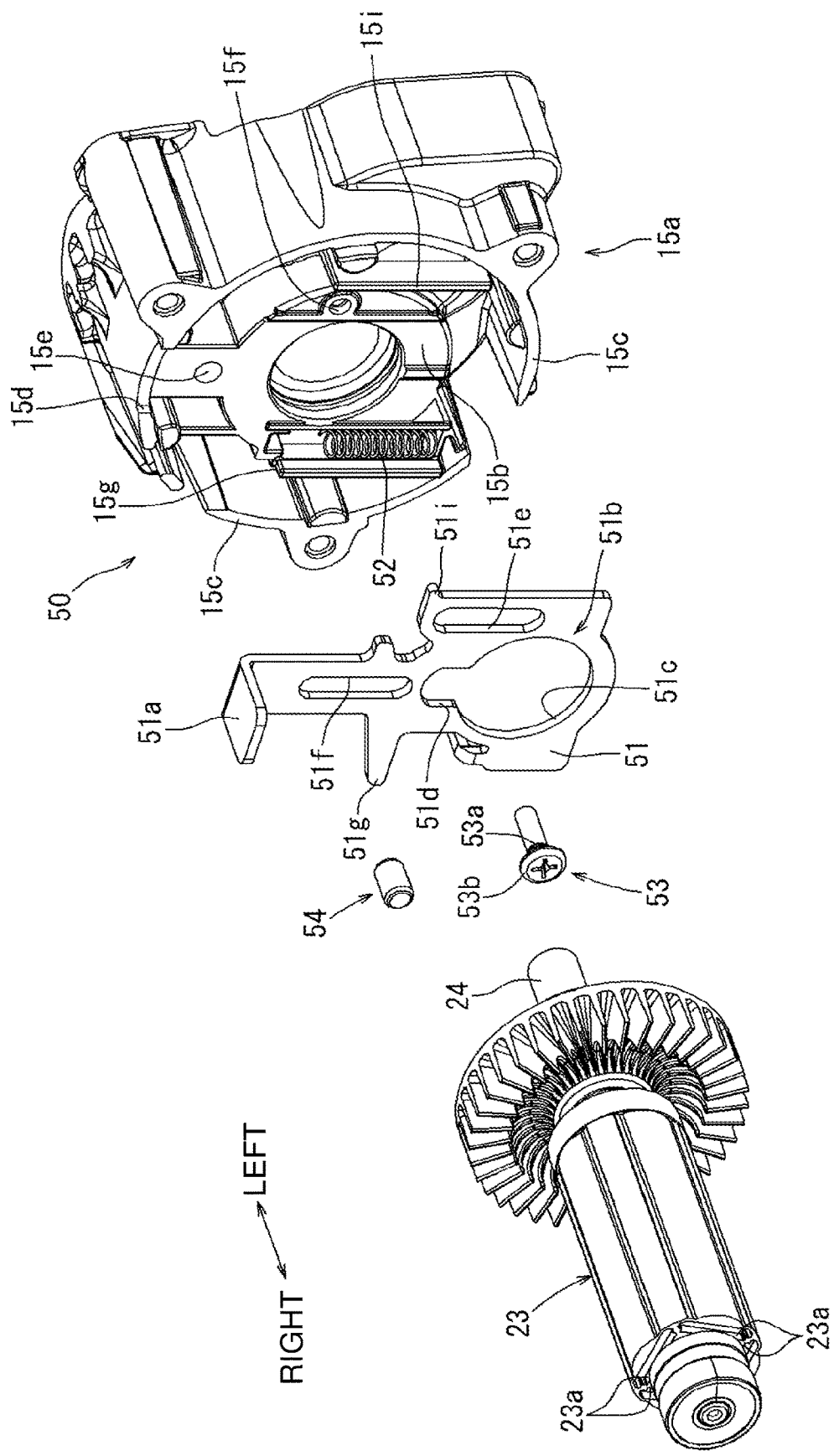
FIG. 4 is an exploded perspective view of a shaft locking mechanism according to the first embodiment.
Figure 5:
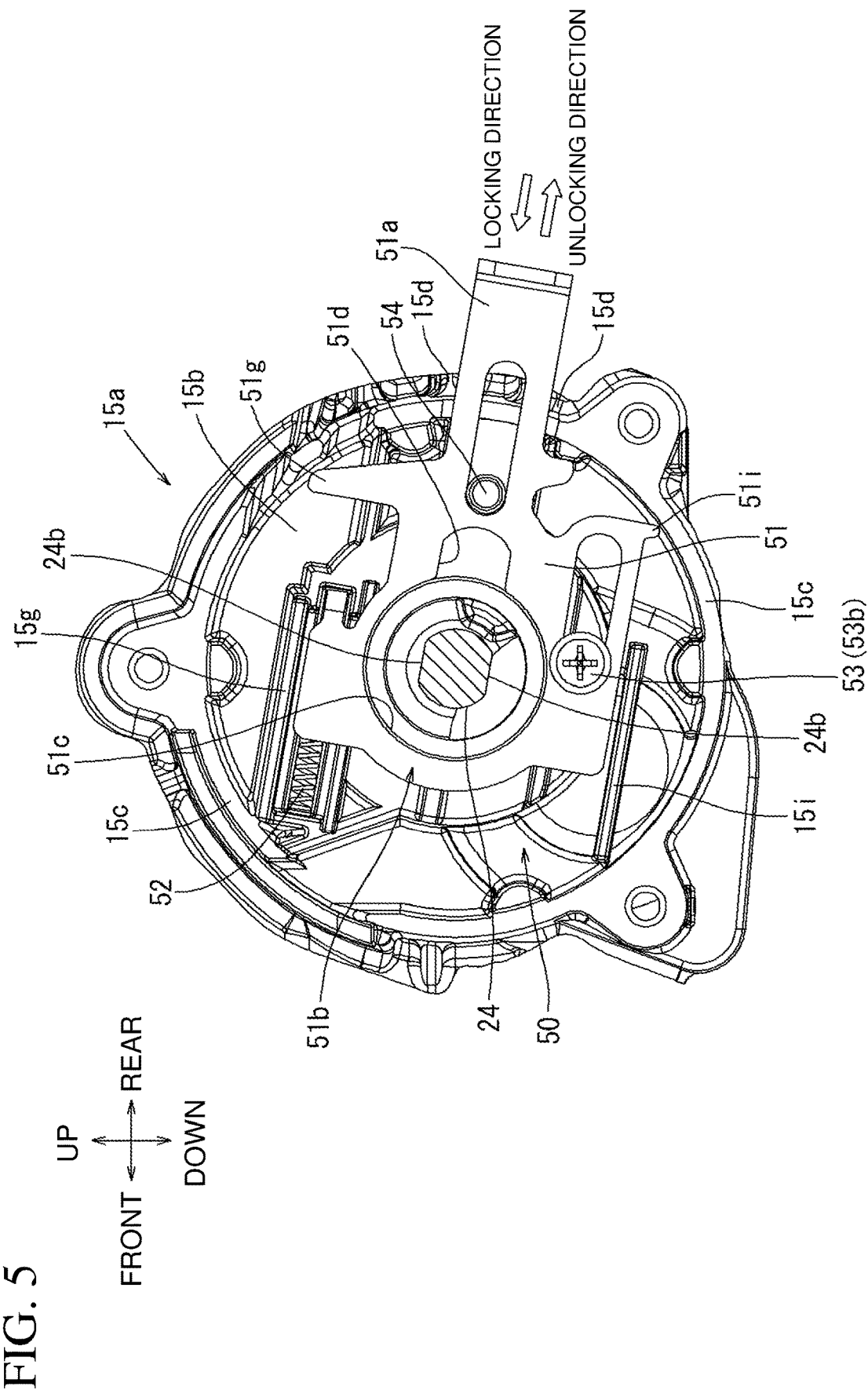
FIG. 5 is a cross-sectional view taken along line V-V in FIG. 3, showing the shaft locking mechanism according to the first embodiment with its locking member at an unlock position, as viewed from the electric motor in the axial direction.
Figure 6:
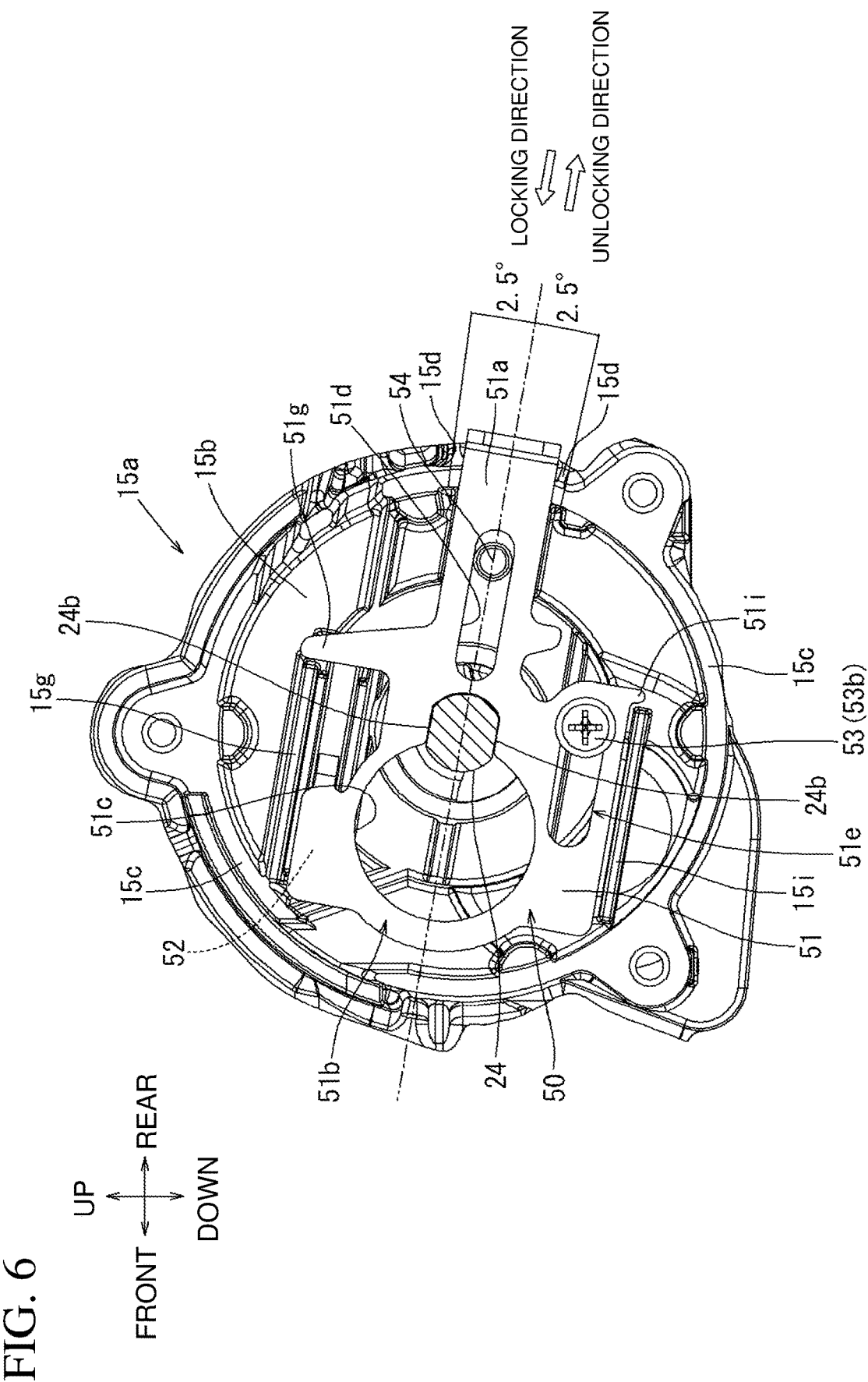
FIG. 6 is a cross-sectional view of the shaft locking mechanism according to the first embodiment with its locking member at a lock position, as viewed from the electric motor in the axial direction.

As shown in FIGS. 4 to 9, the portable circular saw 1 includes a shaft locking mechanism 50. In a nonenergized state, the shaft locking mechanism 50 locks the rotation of the spindle 17. FIGS. 4 to 6 show the shaft locking mechanism 50 according to the first embodiment. The saw blade 2 is attached to or detached from the spindle 17 by turning the fixing bolt 2c relative to the spindle 17. However, the motor shaft 24 can rotate freely in a nonenergized state. Thus, simply turning the fixing bolt 2c may rotate the spindle 17 together. The shaft locking mechanism 50 may be operated to lock the motor shaft 24, securing the spindle 17 to allow the fixing bolt 2c to be turned.

The shaft locking mechanism 50 includes a locking member 51 to be engaged with the motor shaft 24. The locking member 51 is movable between a lock position (FIG. 6) and an unlock position (FIG. 5) in the direction orthogonal to the motor shaft 24. In FIGS. 5 and 6, solid-white arrows indicate the locking direction and the unlocking direction of the locking member 51. For example, the locking member 51 is located inside the motor housing 21 at a position adjacent to the partition 15b in the gear housing 15a. The locking member 51 has an operable member 51a protruding outward from the housing. To lock the motor shaft 24, the user presses the operable member 51a.

The locking member 51 has a hole 51b shaped like a keyhole having a combination of a long slit and a circular hole. The motor shaft 24 is received in the hole 51b. The motor shaft 24 has two flat surfaces 24b. The two flat surfaces 24b are formed on two opposite sides (hidden in FIG. 4). When the flat surfaces 24b received in a circular portion 51c of the hole 51b enter a long slit 51d, the motor shaft 24 is locked to be nonrotatable by the locking member 51. The shaft locking mechanism 50 further includes a compression spring 52. The compression spring 52 is located between the locking member 51 and the partition 15b, and returns the locking member 51 to the unlock position.

The locking member 51 can be pressed at two positions of the motor shaft 24, or more specifically, the flat surfaces 24b of the motor shaft 24 can enter the long slit 51d of the hole 51b every 180 degrees. To lock the motor shaft 24, the user, while pushing the operable member 51a, rotates the motor shaft 24 with the outer flange 2a and the fixing bolt 2c to search for a position at which the locking member 51 can be pressed. The spindle speed is reduced by the reduction gear train to be lower than the speed of the motor shaft 24, and thus the angle of the spindle to be rotated to a position at which the locking member 51 can be pressed is far smaller than 180 degrees. At the position allowing the locking member 51 to be pressed, the locking member 51 is pressed in the locking direction against the urging force from the compression spring 52. The flat surfaces 24b of the motor shaft 24 enter the long slit 51d of the hole 51b, and the motor shaft 24 is locked to be nonrotatable. When the user reduces the pressing force, the locking member 51 is urged in the unlocking direction by the compression spring 52. The motor shaft 24 returns to the circular portion 51c of the hole 51b, thus becoming rotatable again.

Cogging Torque

For a motor with permanent magnets 23a, such as the electric motor 20 in the present embodiment, rotating the motor shaft 24 in a nonenergized state induces the phenomenon of cogging, which causes the feel of periodic unsmooth rotation. The cogging occurs due to the attraction of each permanent magnet 23a in the rotor 23 toward the teeth 22a formed from magnetic materials and protruding toward the rotor 23 as shown in FIGS. 10 to 14. The resultant torque applied to the rotor 23 and the motor shaft 24 is referred to as cogging torque. The magnitude and the direction of the cogging torque periodically depend on the rotational position of the rotor 23 relative to the stator 22. The period is determined in accordance with the least common multiple of the number of magnetic poles (permanent magnets 23a) and the number of teeth 22a. For example, the period is 30 degrees (=360°/12) when four magnetic poles and six teeth are used.

Figure 10:
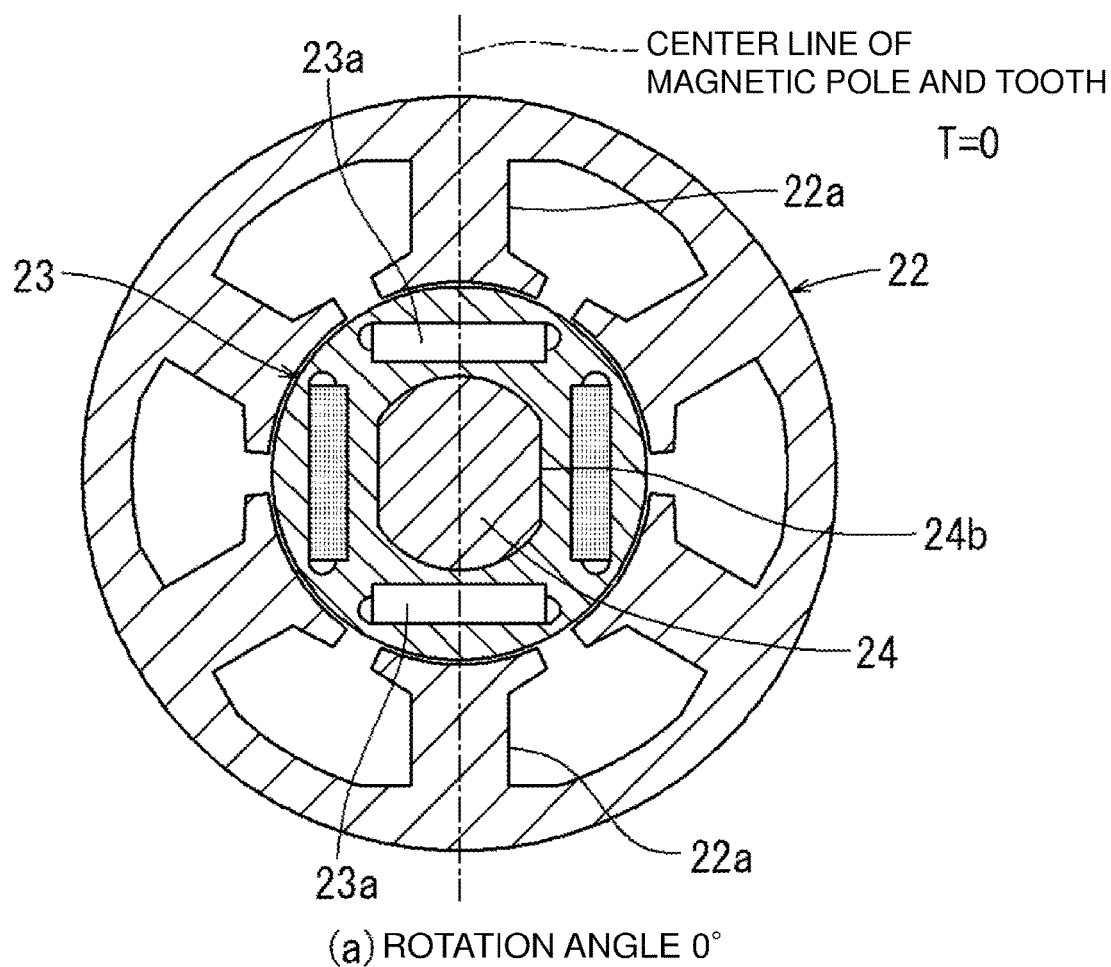
FIG. 10 is a cross-sectional view of a rotor and a stator, showing the rotor at 0 degrees relative to the stator with no cogging torque being generated.
Figure 11:
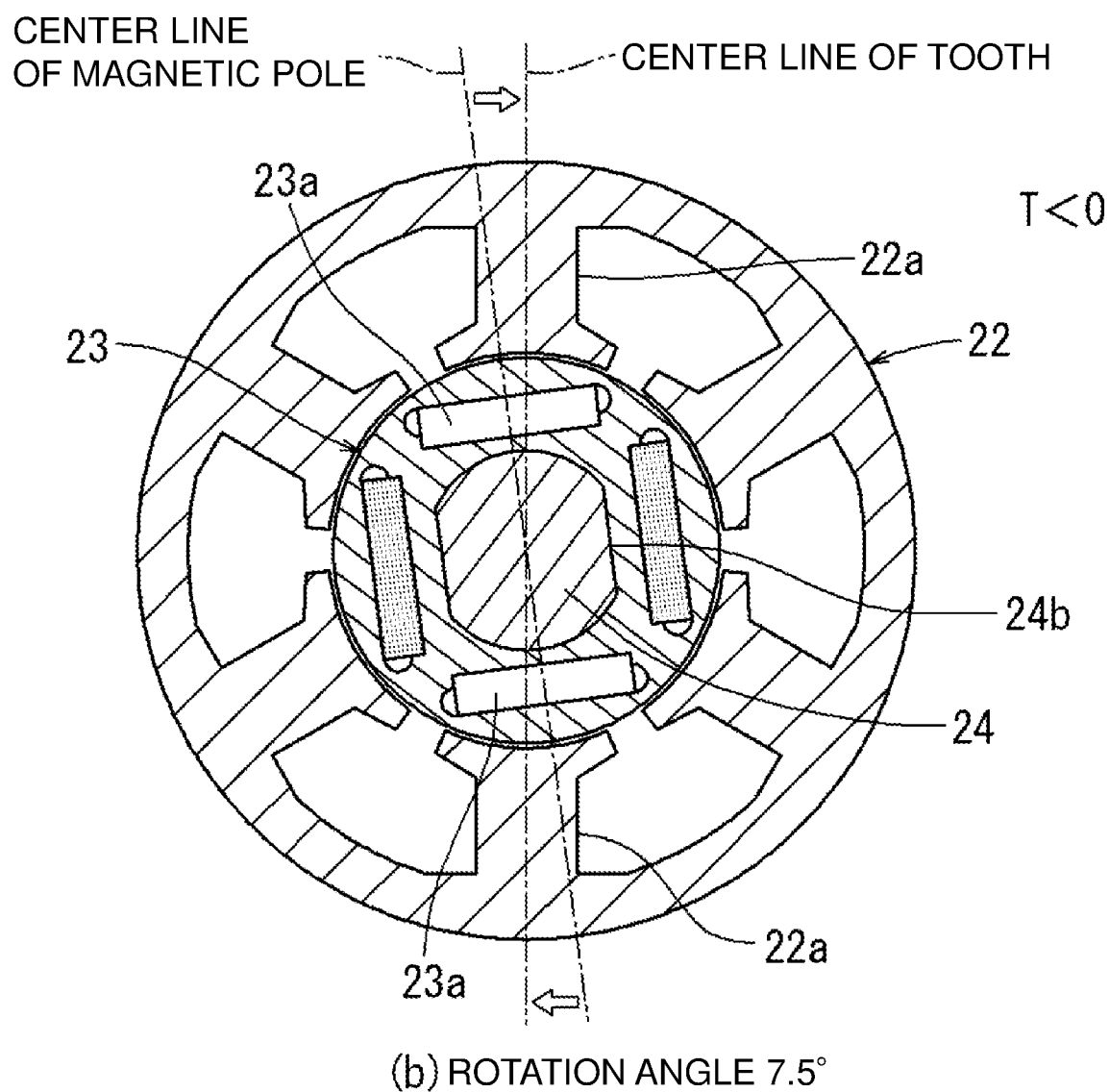
FIG. 11 is a cross-sectional view of the rotor and the stator, showing the rotor at 7.5 degrees relative to the stator with clockwise cogging torque being generated.
Figure 12:
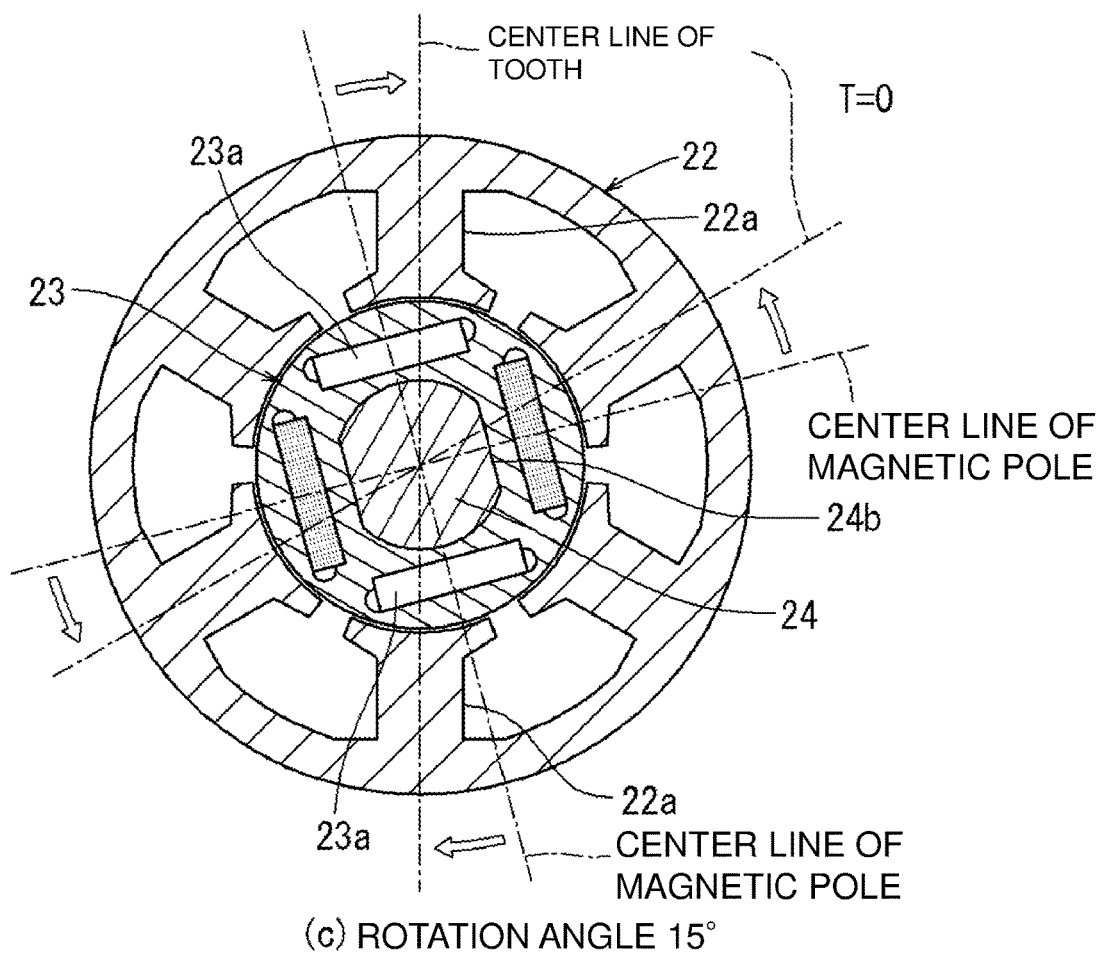
FIG. 12 is a cross-sectional view of the rotor and the stator, showing the rotor at 15 degrees relative to the stator with no cogging torque being generated.
Figure 13:
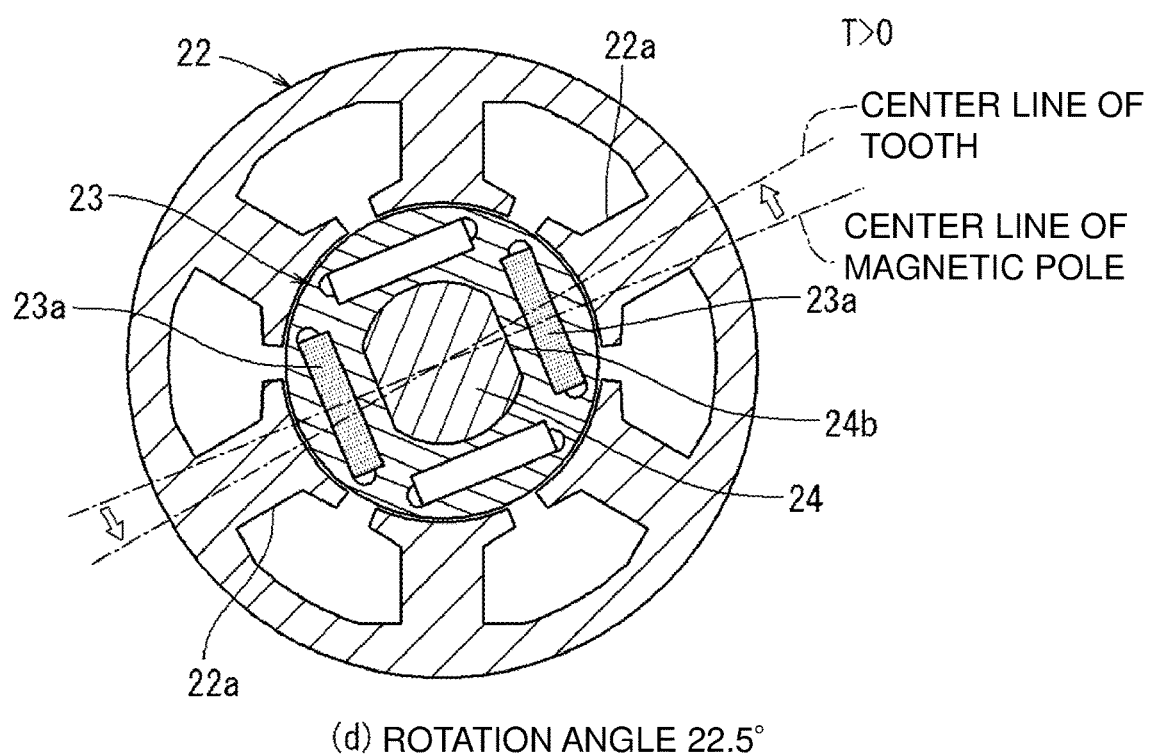
FIG. 13 is a cross-sectional view of the rotor and the stator, showing the rotor at 22.5 degrees relative to the stator with counterclockwise cogging torque being generated.
Figure 14:
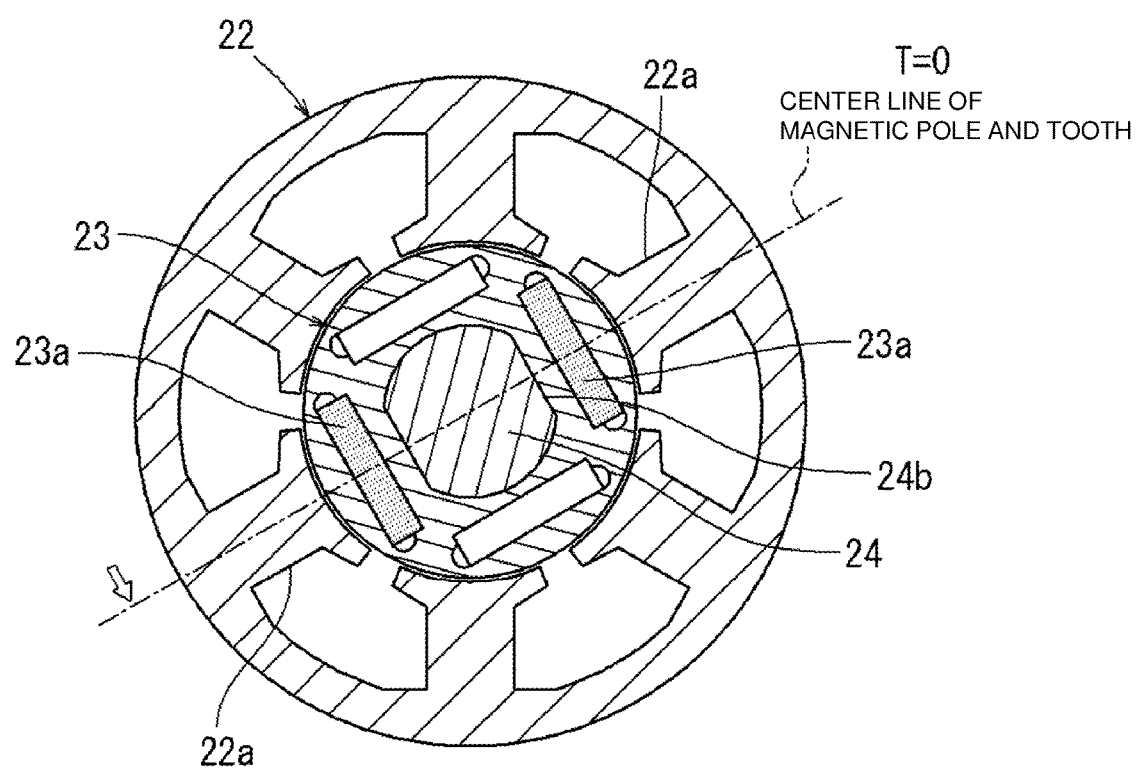
FIG. 14 is a cross-sectional view of the rotor and the stator, showing the rotor at 30 degrees relative to the stator with no cogging torque being generated.
Figure 15:
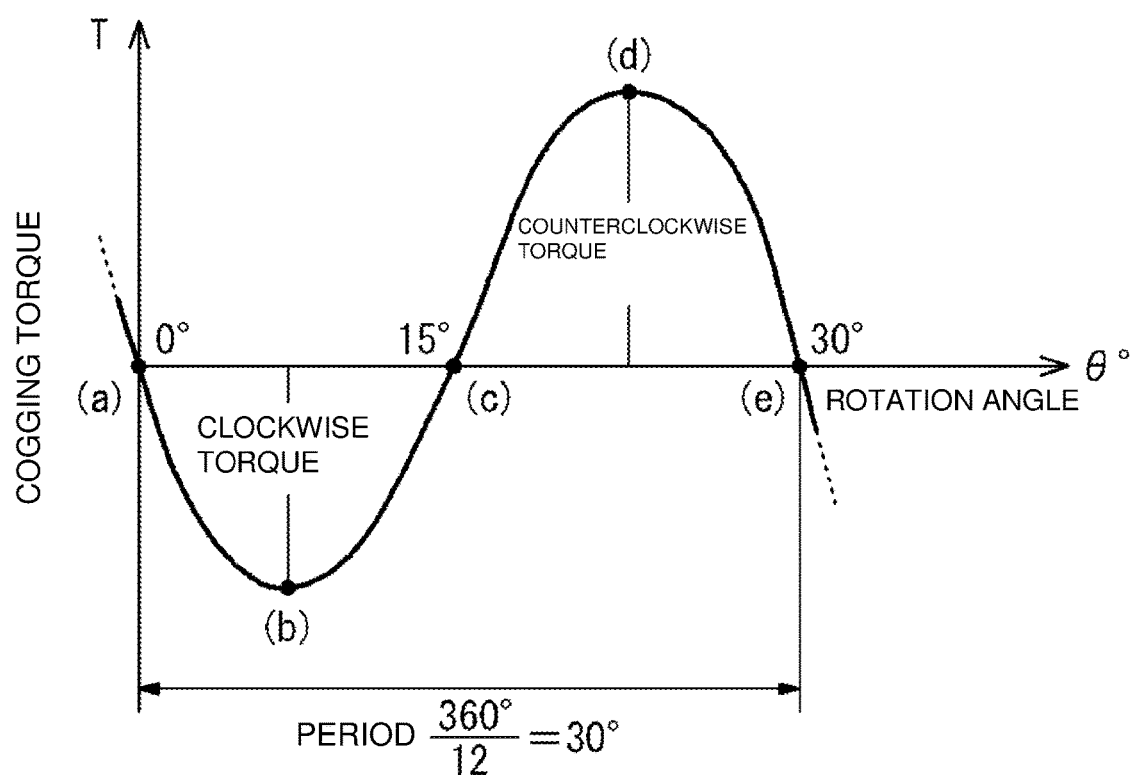
FIG. 15 is a graph showing the cogging torque profile with respect to the rotational position of the rotor.

FIG. 15 is a graph showing the profile of cogging torque T in about one period. For descriptive purposes, the rotation angle θ° (rotational position) of the rotor 23 is 0 degrees at the position in FIG. 10, and a counterclockwise direction as viewed in FIGS. 10 to 14 is a positive direction. Although the profile of cogging torque T is not simple because of its dependence on various factors such as the arrangement and the shapes of components, the graph represents the profile as a sine curve for simplicity. As seen in FIG. 15, the rotor 23 has periodic equilibrium positions at which net cogging torque T is zero with the clockwise torque balancing the counterclockwise torque. The equilibrium positions include stable equilibrium positions (FIGS. 10 and 14) and unstable equilibrium positions (FIG. 12), which alternate, for example, every 15 degrees. With the rotor 23 at other positions (FIGS. 11 and 13), the cogging torque T forces the rotor 23 toward the nearest stable equilibrium positions (FIGS. 10 and 14).

Any motor with permanent magnets (magnet motor) generates cogging torque. In particular, a brushless motor used in the present embodiment includes permanent magnets 23a having a high magnetic force, and thus generates larger cogging torque. In addition, the permanent magnets 23a in the rotor 23 and the flat surfaces of the motor shaft 24 have positional relationships in the rotational direction varying during manufacture. Thus, the positions of the motor shaft allowing the locking member 51 to be pressed may not be equilibrium positions.

Relief of Twisting

As shown in FIGS. 4 to 9, a surrounding wall 15c surrounds the space accommodating the locking member 51. The surrounding wall 15c is integral with the gear housing 15a. The surrounding wall 15c has a cutout 15d through which the operable member 51a protrudes outside the housing. The cutout 15d has a circumferential width with margins at both ends for deviation from the normal position (the position before deviation due to cogging torque) by a predetermined angle relative to the locking member 51. The predetermined angle may be specifically determined in accordance with the magnetic force of the permanent magnets 23a or other factors. An example value of the angle is 2.5 degrees at both ends as shown in FIG. 6. For a narrow cutout 15d, when the locking member 51 is engaged with the motor shaft 24 under the cogging torque, the locking member 51 rotates out of the normal position to twist, and the operable member 51a bites the surrounding wall 15c. With the locking member 51 at a twist position, or out of the normal position, when the user reduces the pressing force to unlock the locking member 51, the locking member 51 cannot easily return to the unlock position due to the friction with the motor shaft 24 and the surrounding wall 15c. However, the cutout 15d having margins allows the operable member 51a to move within the cutout 15d. The operable member 51a is thus less likely to bite the surrounding wall 15c under a certain degree of cogging torque.

The locking member 51 has a long hole 51e having a longitudinal axis in the direction in which the locking member moves. The long hole 51e guides the movement of the locking member 51. The long hole 51e receives a stepped screw 53, which is then screwed and fixed in a screw hole 15f in the partition 15b. The stepped screw 53 has a threadless shank 53a serving as a guide pin. The shank 53a and the long hole 51e guide the movement of the locking member 51 between the lock position and the unlock position. The stepped screw 53 also has a head 53b that prevents the separation of the locking member 51 from the partition 15b. When the locking member 51 at the lock position deviates in a clockwise direction as viewed in FIG. 6, the stepped screw 53 comes in contact with the end of the long hole 51e to prevent the locking member 51 from further rotating. The edge of the long hole 51e receives the stepped screw 53 to prevent clockwise rattling and reduce the possibility of twisting.

The locking member 51 has a leg 51g extending toward the surrounding wall 15c. The gear housing 15a has a projection 15g on the partition 15b to receive the leg 51g. When the locking member 51 at the lock position deviates in a counterclockwise direction as viewed in FIG. 6, the leg 51g comes in contact with the projection 15g to prevent the locking member 51 from further rotating. The projection 15g receives the leg 51g to reliably prevent counterclockwise rattling and reduce the possibility of twisting. Once the locking member 51 starts to move in the unlocking direction, the projection 15g no longer interferes with the locking member 51, causing no bite. The leg 51g extends toward the surrounding wall 15c away from the center line. The projection 15g is located to correspond to the distal end of the leg 51g. Thus, the locking member 51 is received at a position away from the motor shaft 24, and torque generated is likely to overcome cogging torque. The center line is a straight line in the operation direction of the locking member 51 passing through the axis of the motor shaft 24.

The gear housing 15a has a projection 15i opposite to the projection 15g. The locking member 51 has a leg 51i located symmetrically to the leg 51g across the center line. As shown in FIG. 6, the projection 15i and the leg 51i typically have a clearance between them also at the lock position. When the locking member 51 deviates in a clockwise direction as viewed in FIG. 6, the leg 51i comes in contact with the projection 15i to prevent the locking member 51 from further rotating. This reduces twisting of the locking member 51.

The shaft locking mechanism 50 further includes a rubber pin 54 formed from an elastomer such as silicone rubber. The rubber pin 54 provides a restoring force to the locking member 51 that has deviated from the normal position due to twisting caused by cogging torque. The locking member 51 has a long hole 51f in addition to the long hole 51e for the guide pin. The long hole 51f has a longitudinal axis in the direction in which the locking member 51 moves. The rubber pin 54 is received in the long hole 51f. One end of the rubber pin 54 is fixed in a hole 15e in the partition 15b. The rubber pin 54 is positioned to cause the locking member 51 deviating from the normal position to a rotational direction due to cogging torque to come in contact with the rubber pin 54 before the operable member 51a comes in contact with the side edge of the cutout 15d in the surrounding wall 15c. When the locking member 51 deviates from the normal position to a rotational direction due to cogging torque, the rubber pin 54 pushes the side of the long hole 51f back to return the locking member 51 to the normal position. The locking member 51 approaching the normal position relieves its twisting, and the urging force from the compression spring 52 is applied effectively to allow the locking member 51 to easily return to the unlock position. This avoids increasing the force of the compression spring 52 urging the locking member 51 in the unlocking direction. The rubber pin 54 guides the movement of the locking member 51 together with the long hole 51f. The rubber pin 54 also prevents unusual noise caused by the locking member 51 rattling during use of the portable circular saw 1.

Second Embodiment

Figure 7:
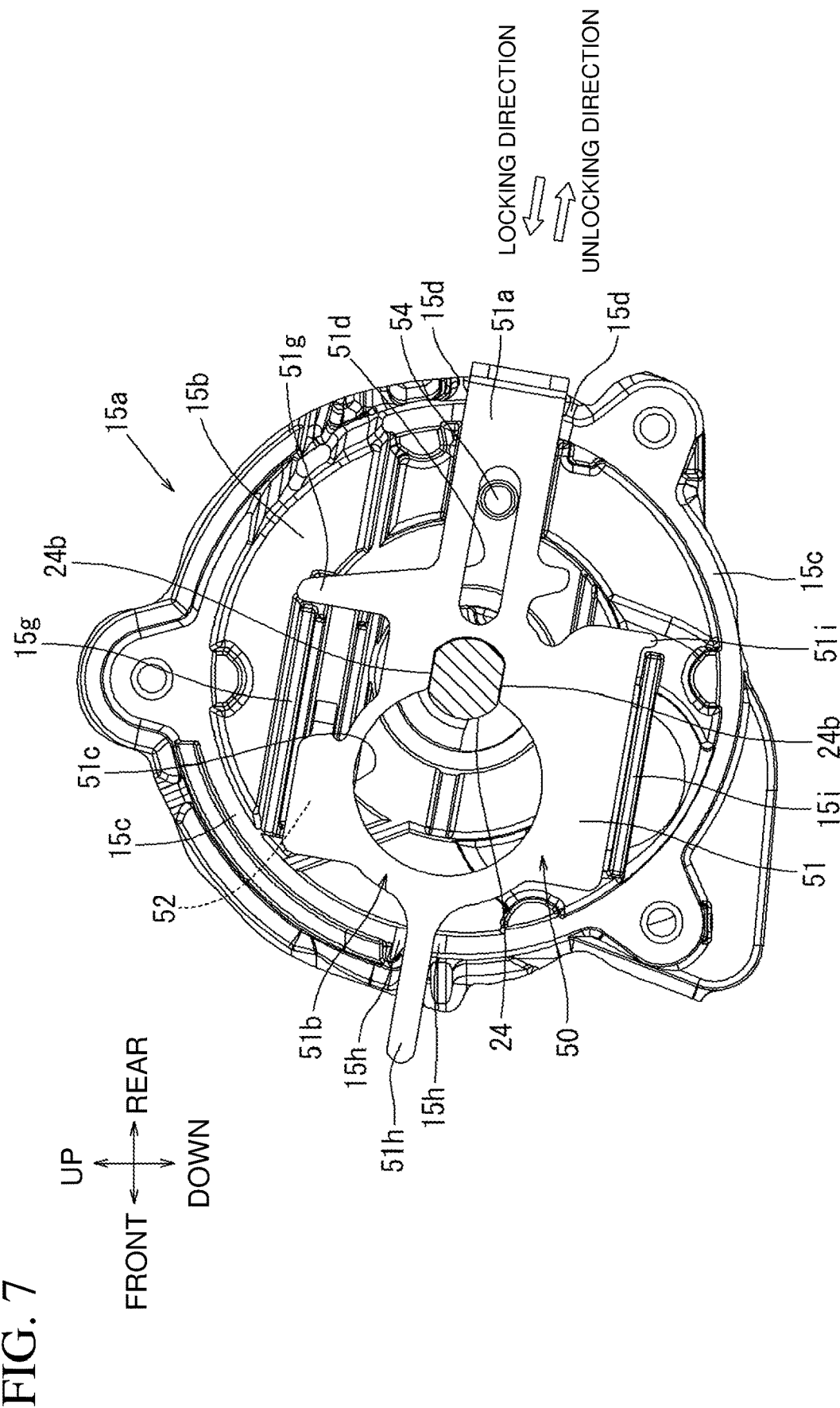
FIG. 7 is a cross-sectional view of a shaft locking mechanism according to a second embodiment as viewed from the electric motor in the axial direction.

As shown in FIG. 7, the shaft locking mechanism 50 according to the present embodiment includes a protruding portion 51h protruding outward from the surrounding wall 15c, in place of the stepped screw 53. The surrounding wall 15c has a guiding cutout 15h. The cutout 15h receives the protruding portion 51h. The protruding portion 51h and the cutout 15h guide the movement of the locking member 51 between the lock position and the unlock position.

Third Embodiment

Figure 8:
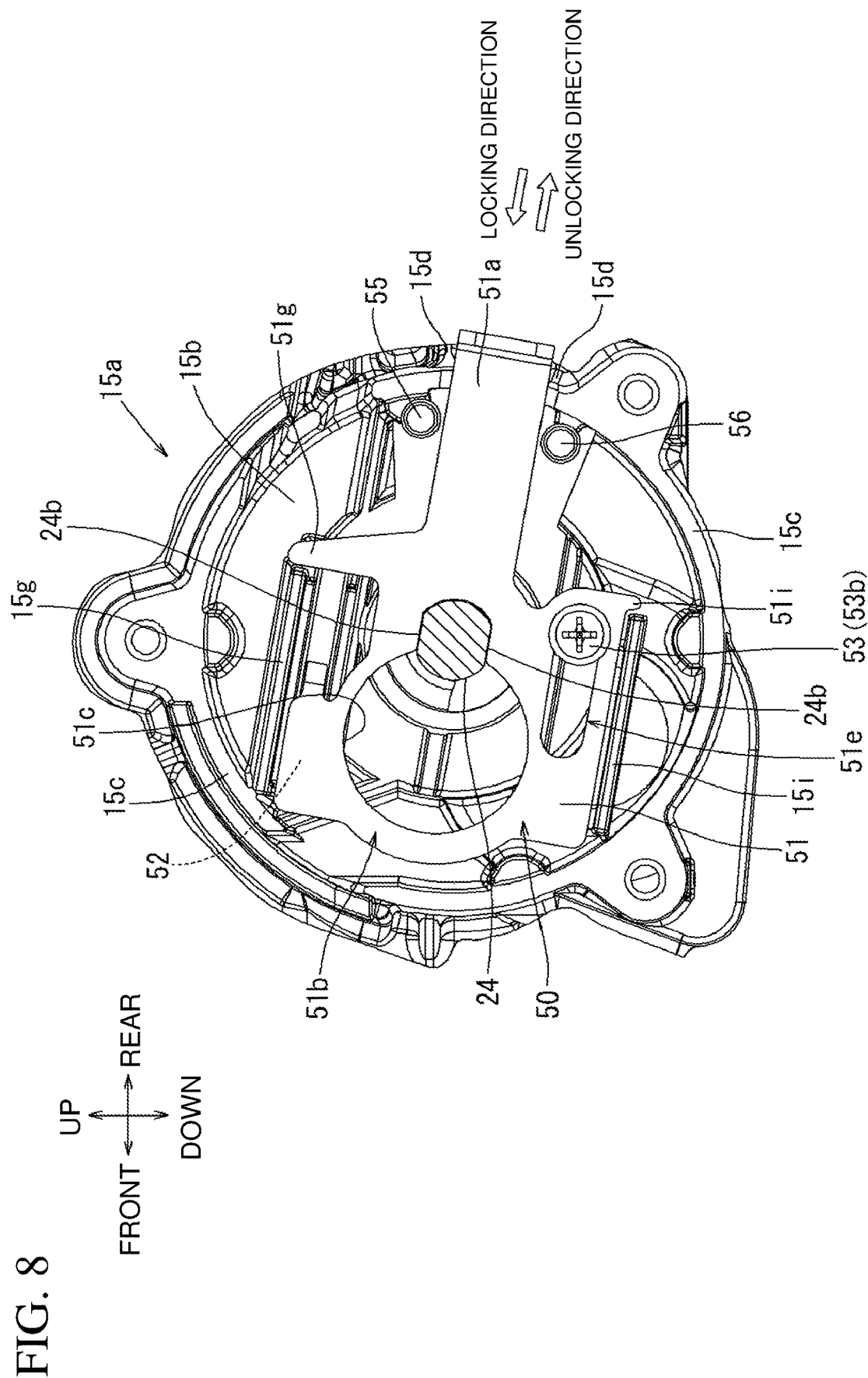
FIG. 8 is a cross-sectional view of a shaft locking mechanism according to a third embodiment as viewed from the electric motor in the axial direction.

As shown in FIG. 8, the shaft locking mechanism 50 according to the present embodiment includes two rubber pins 55 and 56 at both sides of the operable member 51a, in place of the single rubber pin 54 and the long hole 51f. The two rubber pins 55 and 56 push the sides of the locking member 51 back against the clockwise and the counterclockwise cogging torque. The rubber pins 55 and 56, which are located adjacent to the surrounding wall 15c, facilitate generation of torque against cogging torque. The two rubber pins 55 and 56 also share the load of torque in different directions between them and allow the locking member 51 to have a simpler shape.

Fourth Embodiment

Figure 9:
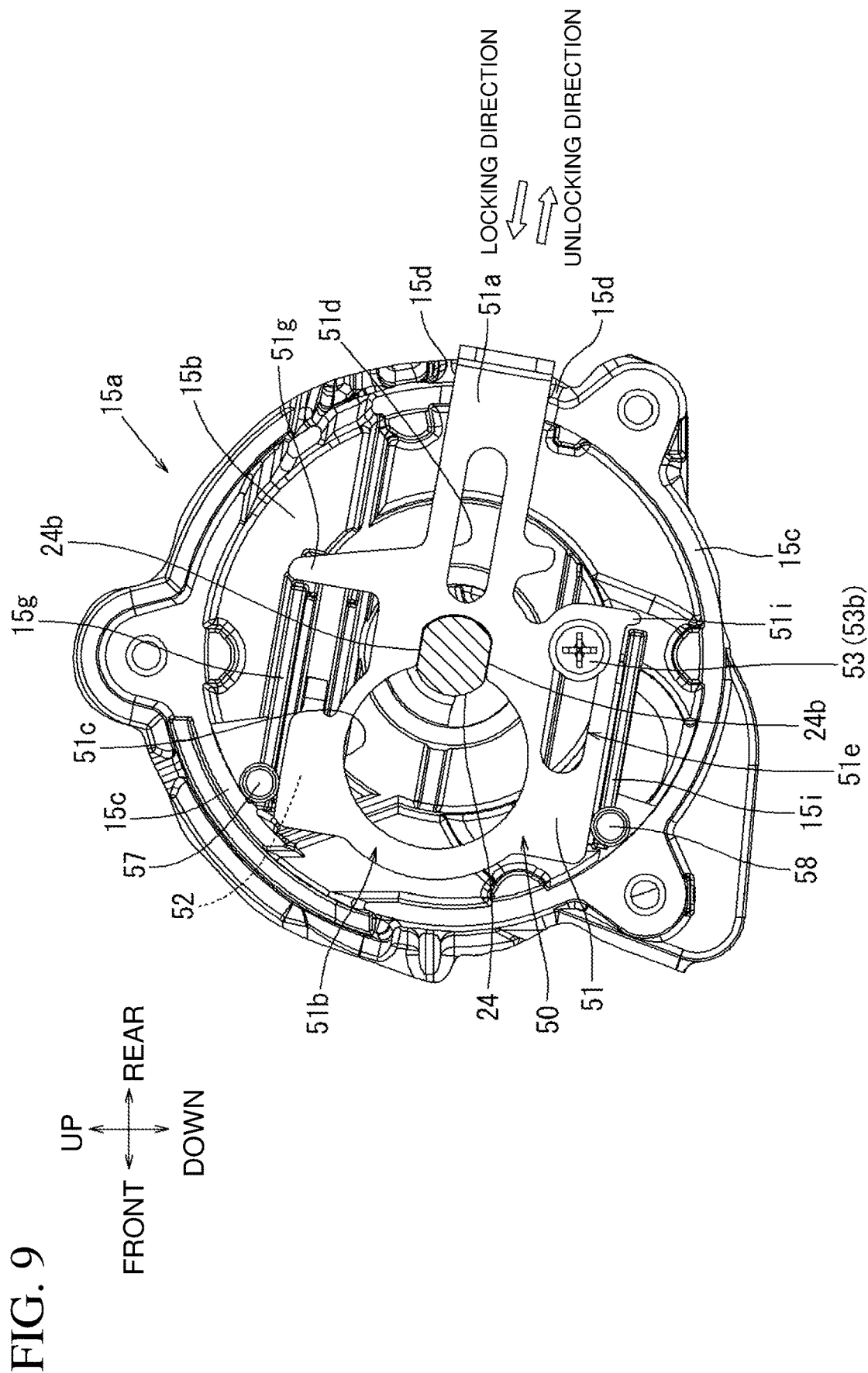
FIG. 9 is a cross-sectional view of a shaft locking mechanism according to a fourth embodiment as viewed from the electric motor in the axial direction.

As shown in FIG. 9, the shaft locking mechanism 50 according to the present embodiment includes two rubber pins 57 and 58 opposite to the corresponding rubber pins with respect to the axis in the third embodiment.

In another embodiment (not shown), the rubber pin 54 may be replaced with a metal pin coated with an elastomer such as a thermoplastic elastomer (TPE). In some embodiments, with the rubber pin 54 replaced with a metal pin, the locking member 51 may be partially coated with an elastomer on the edge to be in contact with the metal pin or an elastomer member may be fixed to the edge. In either case, the metal pin may be located at the same position as each of the rubber pins 54 to 58 in the above embodiments.

In still another embodiment, the locking member 51 of the shaft locking mechanism 50 may not be engaged with the motor shaft 24 but may be engaged with the spindle 17. In some embodiments in which the reduction gear train is a two- or multi-stage speed reduction gear, the locking member 51 may be engaged with the countershaft of the reduction gear train.

In the portable circular saw 1 according to each embodiment, when the locking member 51 is engaged with the motor shaft 24 under a certain degree of cogging torque, and deviates in a rotational direction, the elastomer covering the rubber pins 54 to 58 or the metal pin pushes the locking member 51 back by the elastic force. As a result, the locking member 51 approaches the normal position to relieve twisting.

Although the embodiments of the prevent invention are described above specifically, the invention is not limited to these embodiments. The embodiments may be variously substituted, modified, or altered by those skilled in the art without departing from the scope of the invention.

REFERENCE SIGNS LIST

W workpiece
1 portable circular saw
2 saw blade
2a outer flange
2c fixing bolt
3 base
3a window
4, 6 support
5, 7 tilt support shaft
10 tool body
11 stationary cover
12 swing support shaft
14 movable cover
15 reduction gear train
15a gear housing
15b partition
15c surrounding wall
15d cutout
15e hole
15f screw hole
15g projection
15h cutout
15i projection
16 follower gear
17 spindle
20 electric motor
21 motor housing
22 stator
22a tooth
23 rotor
23a permanent magnet
24 motor shaft
24a drive gear
24b flat surface
25, 26 bearing
28 sensor board
30 battery mount
31 battery pack
32 controller
40 main handle
42 switch lever
44 front handle
50 shaft locking mechanism
51 locking member
51a operable member
51b hole
51c circular portion of hole
51d long slit of hole
51e long hole for stepped screw (second long hole)
51f long hole for rubber pin (first long hole)
51g leg
51h protruding portion
51i leg
52 compression spring
53 stepped screw (abutting member)
53a shank
53b head
54 to 58 rubber pin (abutting member)

What is claimed is:

1. A power tool, comprising:
    a housing;
    an electric motor located inside the housing and including a permanent magnet;
    a shaft rotatable about an axis relative to the housing and configured to transmit power from the electric motor;
    a locking member movable between a lock position and an unlock position in a nonenergized state of the electric motor, and engageable with the shaft at the lock position to lock rotation of the shaft; and
    an abutting member configured to apply, to the locking member at the lock position, a force in a direction opposite to an axial torque caused by the permanent magnet and applied to the locking member;
    wherein the abutting member is an elastic member; and
    wherein the locking member has a first long hole having a longitudinal axis in a direction of movement of the locking member, and the first long hole receives the abutting member.

2. The power tool according to claim 1, wherein the abutting member includes
    a first abutting member configured to apply a force to the locking member in a direction opposite to an axial torque in a first direction, and
    a second abutting member configured to apply a force to the locking member in a direction opposite to an axial torque in a second direction.

3. The power tool according to claim 1, wherein
    the housing includes a surrounding wall circumferentially surrounding the shaft, and the surrounding wall has a cutout,
    the locking member includes an operable member protruding outside the housing through the cutout, and
    when the locking member at the lock position receives an axial torque, the locking member comes in contact with the abutting member before the operable member comes in contact with a side edge of the cutout.

4. The power tool according to claim 1, wherein
    the locking member has a second long hole parallel to the first long hole, and
    the power tool further includes a guide pin placed through the second long hole and guidable by the second long hole as the locking member moves between the lock position and the unlock position.

5. The power tool according to claim 4, wherein
    the guide pin is a stepped screw having a shank, and
    the shank is guidable by the second long hole as the locking member moves between the lock position and the unlock position.

6. The power tool according to claim 5, wherein
    the abutting member includes
    a first abutting member configured to apply a force to the locking member in a direction opposite to an axial torque in a first direction, and a second abutting member configured to apply a force to the locking member in a direction opposite to an axial torque in a second direction.

7. The power tool according to claim 5, wherein
the housing includes a surrounding wall circumferentially surrounding the shaft, and the surrounding wall has a cutout,
the locking member includes an operable member protruding outside the housing through the cutout, and
when the locking member at the lock position receives an axial torque, the locking member comes in contact with the abutting member before the operable member comes in contact with a side edge of the cutout.

8. The power tool according to claim 4, wherein
the abutting member includes
a first abutting member configured to apply a force to the locking member in a direction opposite to an axial torque in a first direction, and
a second abutting member configured to apply a force to the locking member in a direction opposite to an axial torque in a second direction.

9. The power tool according to claim 4, wherein
the housing includes a surrounding wall circumferentially surrounding the shaft, and the surrounding wall has a cutout,
the locking member includes an operable member protruding outside the housing through the cutout, and
when the locking member at the lock position receives an axial torque, the locking member comes in contact with the abutting member before the operable member comes in contact with a side edge of the cutout.

10. The power tool according to claim 1, wherein
the housing includes a surrounding wall circumferentially surrounding the shaft, and the surrounding wall has a cutout,
the locking member includes an operable member protruding outside the housing through the cutout, and
when the locking member at the lock position receives an axial torque, the locking member comes in contact with the abutting member before the operable member comes in contact with a side edge of the cutout.

11. The power tool according to claim 1, wherein
the abutting member includes
a first abutting member configured to apply a force to the locking member in a direction opposite to an axial torque in a first direction, and
a second abutting member configured to apply a force to the locking member in a direction opposite to an axial torque in a second direction.

12. The power tool according to claim 11, wherein
the housing includes a surrounding wall circumferentially surrounding the shaft, and the surrounding wall has a cutout,
the locking member includes an operable member protruding outside the housing through the cutout, and
when the locking member at the lock position receives an axial torque, the locking member comes in contact with the abutting member before the operable member comes in contact with a side edge of the cutout.

13. The power tool according to claim 1, wherein
the housing includes a surrounding wall circumferentially surrounding the shaft, and the surrounding wall has a cutout,
the locking member includes an operable member protruding outside the housing through the cutout, and
when the locking member at the lock position receives an axial torque, the locking member comes in contact with the abutting member before the operable member comes in contact with a side edge of the cutout.

14. The power tool according to claim 1, wherein
the housing includes
a partition through which the shaft extends, and
a projection extending from the partition,
the locking member includes a leg, and
when the locking member at the lock position rotates, the leg comes in contact with the projection to reduce twisting of the locking member.

15. The power tool according to claim 1, wherein
the shaft is an output shaft of the electric motor.

16. The power tool according to claim 1, further comprising:
a base having a lower surface to be in contact with a workpiece;
a tool body located above the base and coupled to the base in a vertically swingable manner; and
a circular cutting tool attachable to and detachable from the tool body, the cutting tool being rotatable using the electric motor as a driving source to cut the workpiece with a portion of the cutting tool protruding downward from the base.

* * * * *